United States Patent
Harris et al.

(10) Patent No.: US 7,153,356 B1
(45) Date of Patent: Dec. 26, 2006

(54) CHILDREN'S WASHABLE PAINT

(75) Inventors: Philip G. Harris, Spartanburg, SC (US); William G. Hopkins, Jr., Spartanburg, SC (US); Kerrie L. Bryant, Spartanburg, SC (US); E. Kyle Stephenson, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 11/252,020

(22) Filed: Oct. 17, 2005

(51) Int. Cl.
*C09D 5/00* (2006.01)
*C09D 5/06* (2006.01)
*C09D 101/02* (2006.01)

(52) U.S. Cl. ............ 106/465; 106/192.1; 106/203.2; 106/311; 106/487; 106/499; 524/35; 524/45

(58) Field of Classification Search ............ 106/311, 106/465, 487, 499, 192.1, 203.2; 524/35, 524/45
See application file for complete search history.

(56) References Cited

U.S. PATENT DOCUMENTS

| | | | |
|---|---|---|---|
| 4,504,395 A | 3/1985 | Harpel et al. ............... 210/712 |
| 4,677,158 A | 6/1987 | Tso et al. ................... 524/789 |
| 4,978,390 A | 12/1990 | Snedeker ................. 106/31.09 |
| 5,043,013 A | 8/1991 | Kluger et al. ............ 106/31.32 |
| 5,059,244 A | 10/1991 | King et al. .............. 106/31.32 |
| 5,116,410 A | 5/1992 | Miller ......................... 106/22 |
| 5,480,480 A | 1/1996 | Lynch et al. ................ 106/311 |
| 5,574,081 A | 11/1996 | Kroon ......................... 524/56 |
| 5,616,635 A | 4/1997 | Patel ........................... 524/37 |
| 6,221,145 B1 | 4/2001 | McClain .................... 106/443 |
| 6,235,273 B1 | 5/2001 | Mackey ....................... 424/63 |

*Primary Examiner*—Anthony J. Green
(74) *Attorney, Agent, or Firm*—Terry T. Moyer; Robert M. Lanning

(57) ABSTRACT

The invention relates to a washable paint comprising about 2.5 to 10 weight percent of a high molecular weight polyethylene glycol having a molecular weight between 2,000 and 20,000, a water swellable clay in the amount of 0.5 to 1.5 weight percent; and a high molecular weight cellulosic thickener in the amount of about 1.0 to 2.5 weight percent, wherein the high molecular weight cellulosic thickener has a viscosity between 500 and 15,000 cps tested as a 2% by weight solution in water at 25° C. using a Brookfield DV-II+ viscometer with a number 21 spindle and a speed of 2 rpm, and wherein the paint has a viscosity of between 5,000 and 50,000 cps tested on a Brookfield DV-II+ viscometer with a number 6 spindle at 10 rpm and 52° C.

22 Claims, 5 Drawing Sheets

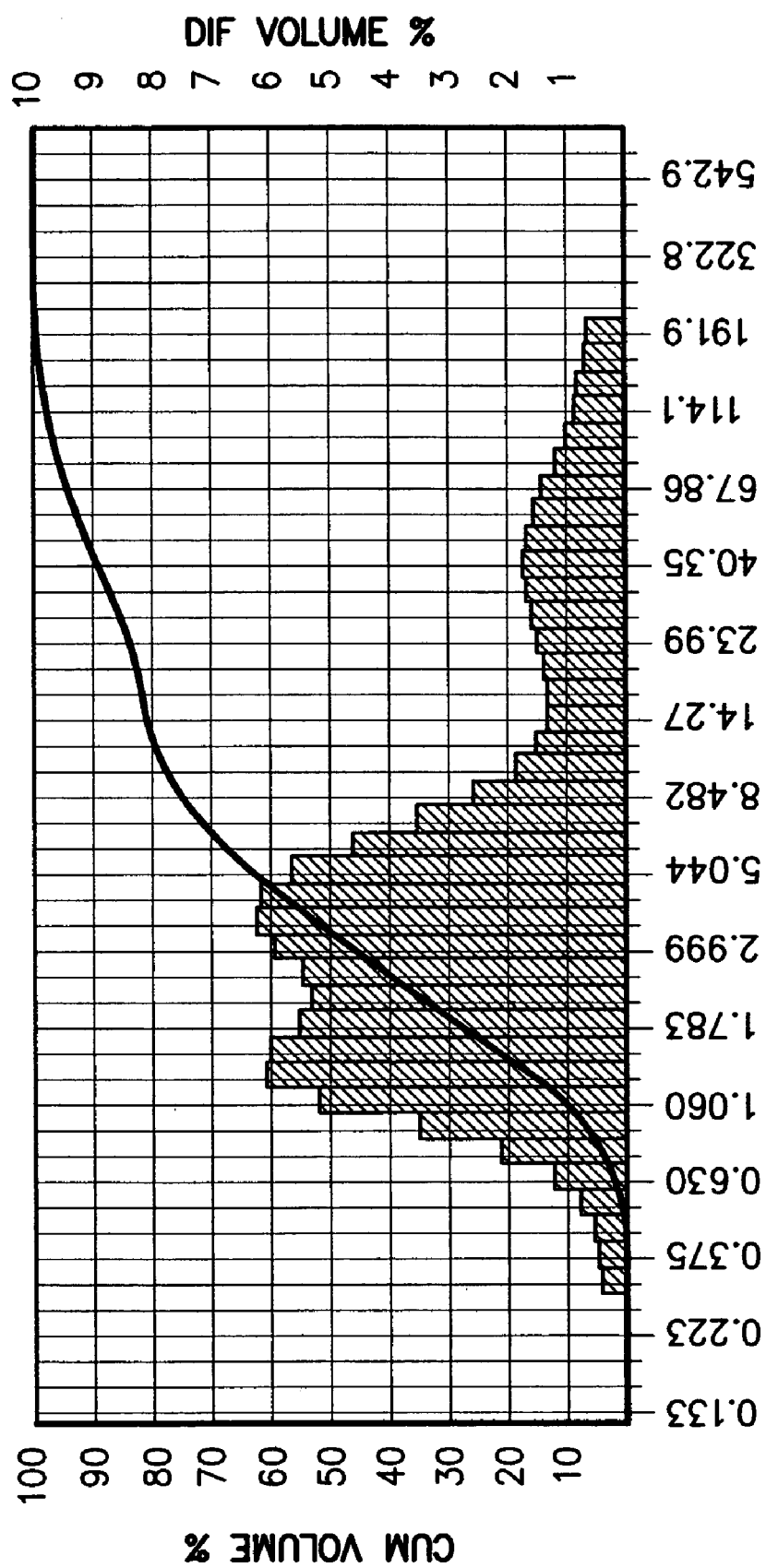
FIG. -1-

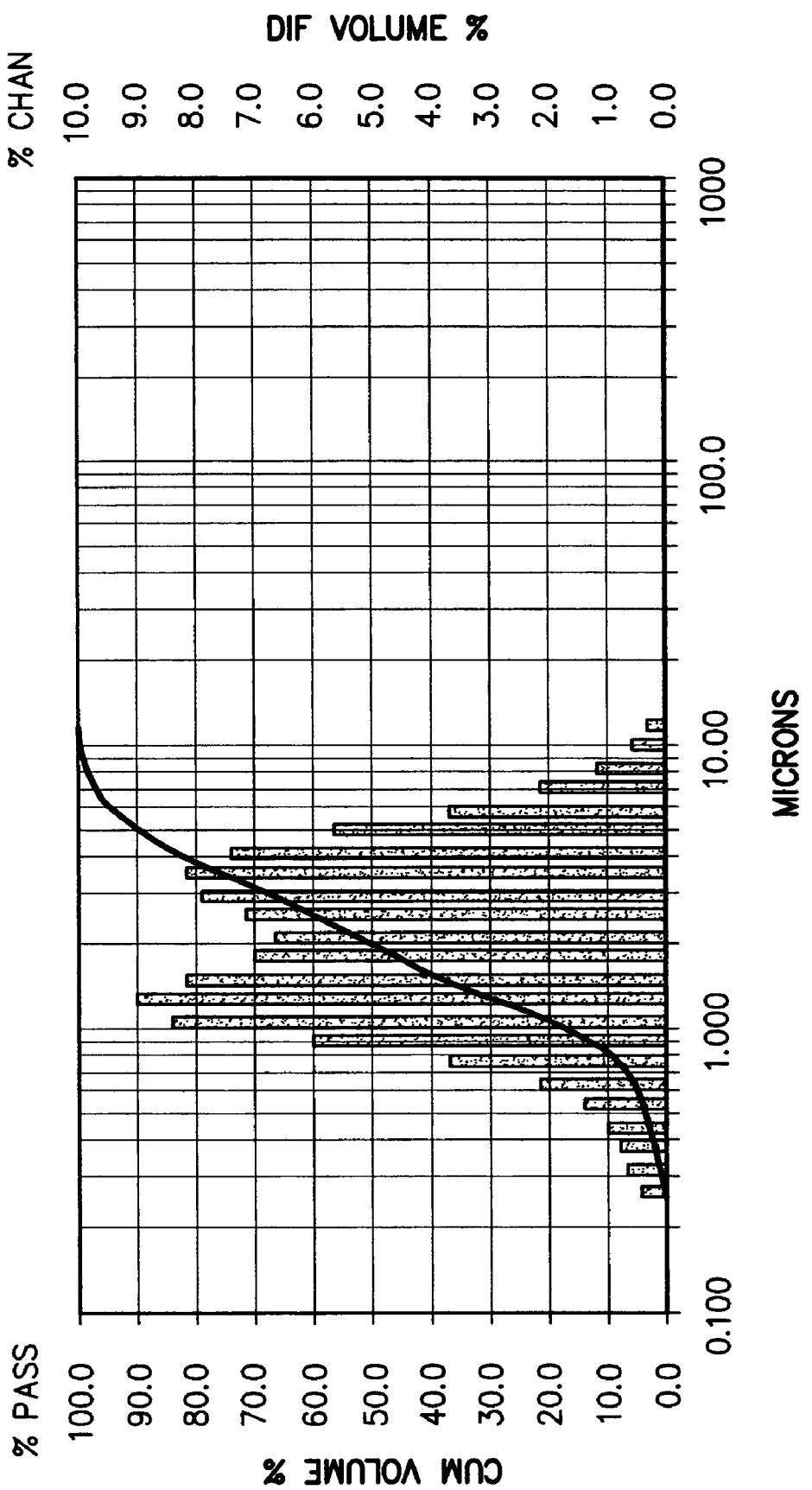
FIG. -2-

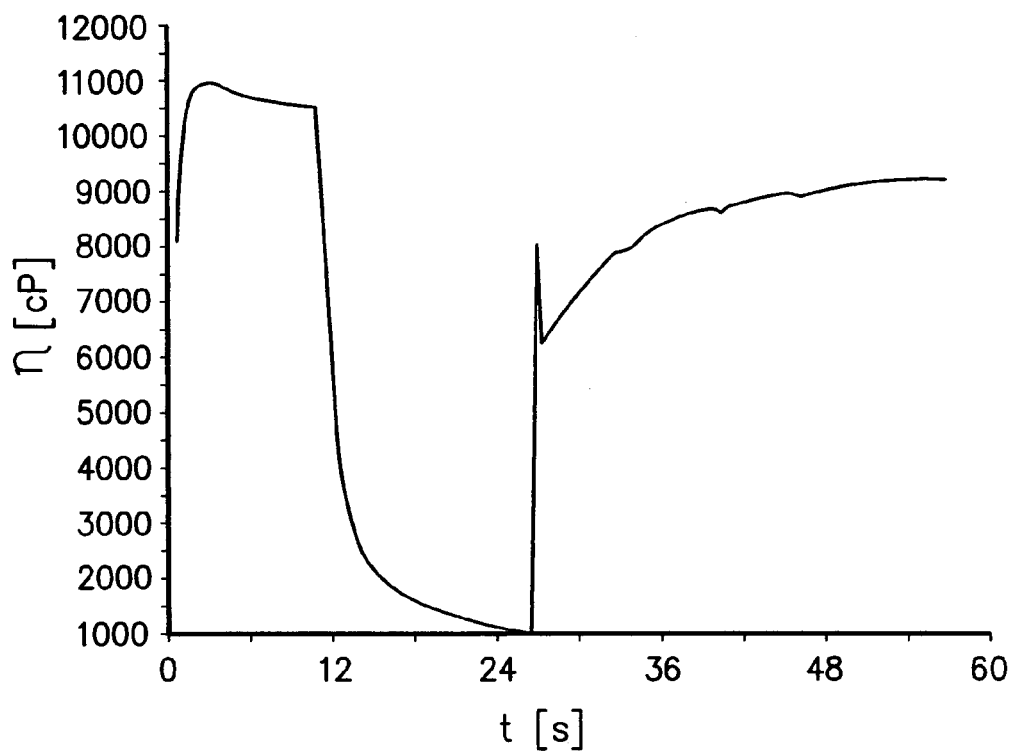
FIG. -3-
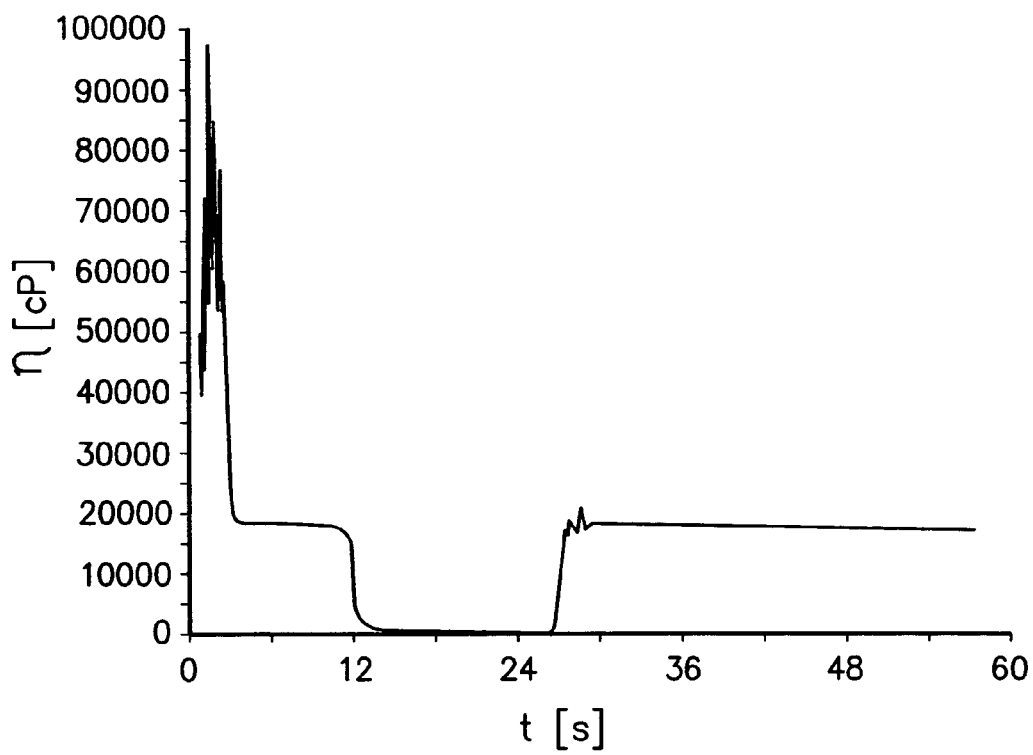
FIG. -4-

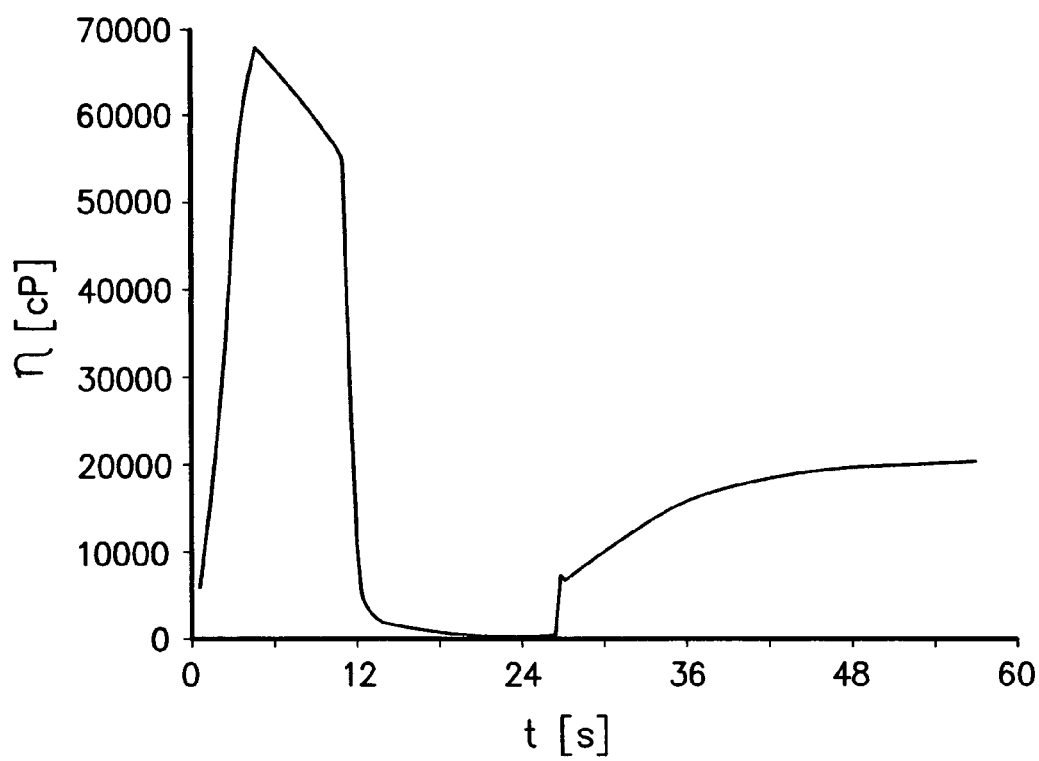
FIG. -5-
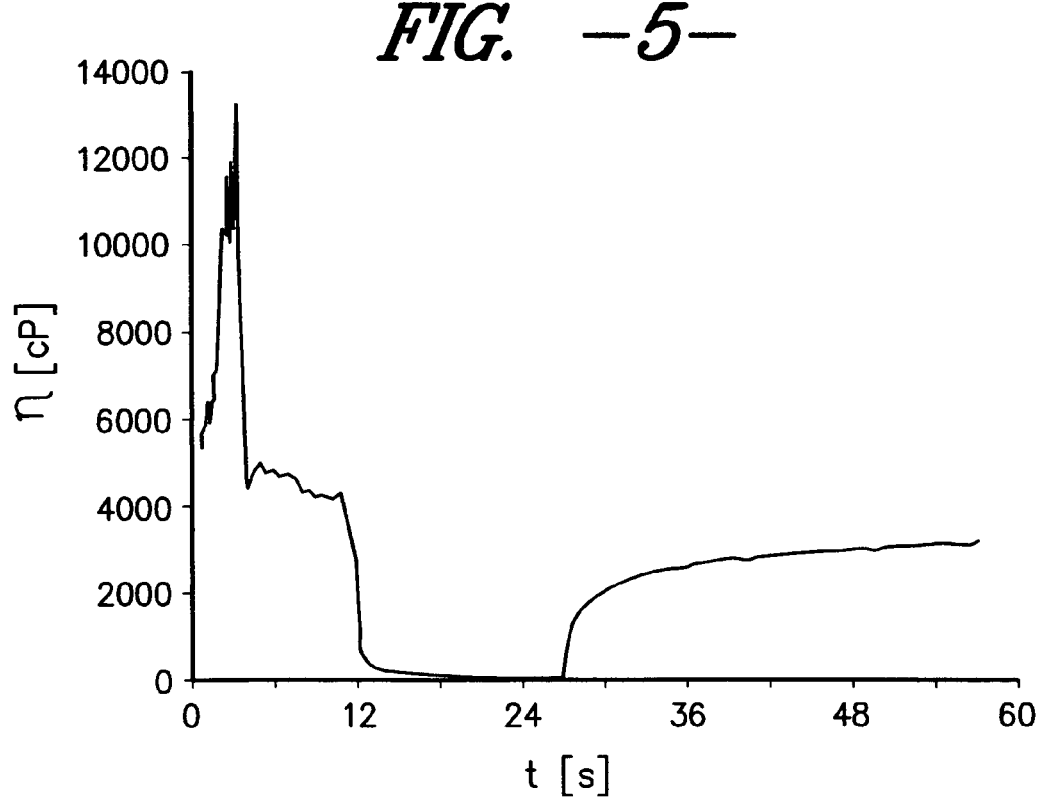
FIG. -6-

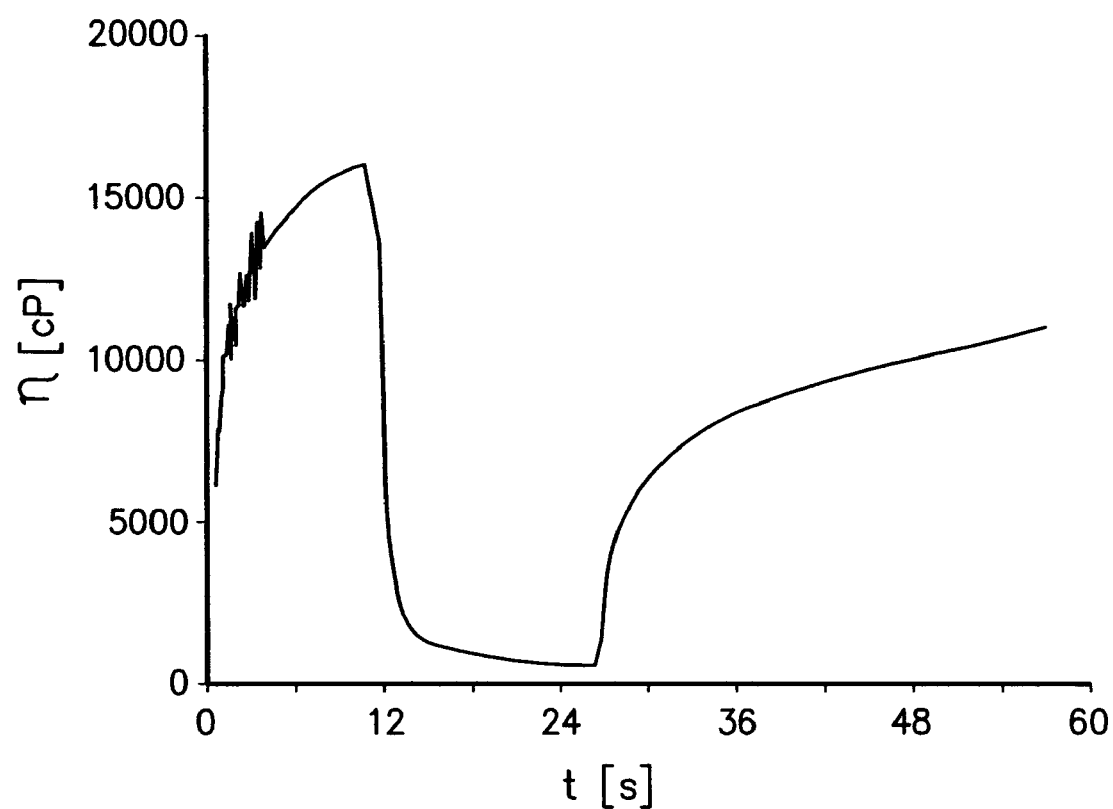
FIG. -7-

CHILDREN'S WASHABLE PAINT

BACKGROUND

The present invention generally relates to paint that is washable from fabric and skin.

It is well known that a major deficiency of children's paints is their propensity to leave enduring stains on both skin and clothing. While permanence is a desirable characteristic of the so-called "permanent" paints, it is one of the most objectionable of properties for paints used by young children. Accordingly, much effort has been expended over many years by producers of these instruments to reduce or eliminate staining. This is attested to by the rather numerous offerings of so-called "washable" paints, which on close examination, are found to be removed either very poorly from fabrics that are typically used in children's clothing, removed poorly from skin, or have poor color saturation.

The majority of children's washable paints use pigments as the color source. While labeled as washable, washable paints using pigments will tend to permanently stain a variety of fabrics and other porous surfaces if the paint is allowed to dry.

In addition, some children's washable paints use acid dyes as the color source. While also labeled as washable, these paints will tend to stain skin and other porous surfaces within a few minutes of contact.

There are a number of commercially available additives that are known to increase the washability of acid dyes from skin and other porous surfaces.

One strategy to improve washability is to use low levels of colorants which give lighter color shades and less opacity on paper. Because there is less color in the paint, it is easier to remove from skin and fabric, but results in lower saturation paints. Polymeric colorants may also be used in washable paints. Some polymeric colorants are described in U.S. Pat. No. 5,043,013.

BRIEF DESCRIPTION OF THE DRAWINGS

FIG. 1 shows the particle size distribution for the paint base which had not been sufficiently sheared.

FIG. 2 shows the particle size distribution of a paint base made in commercial size equipment that had been sheared for 40 minutes at a tip speed of 4,000 to 5,000 rpm.

FIG. 3 shows the plate-on-plate viscosity for the inventive paint.

FIG. 4 shows the plate-on-plate viscosity for the paint thickened only with hectorite clay.

FIG. 5 shows the plate-on-plate viscosity for the paint thickened only with carboxymethyl cellulose.

FIG. 6 shows the plate-on-plate viscosity for cellulose ether/hectorite clay thickened paint at 125° F.

FIG. 7 shows the plate on plate viscosity for the inventive paint at 125° F.

DETAILED DESCRIPTION

The invention has numerous advantages compared to prior art washable paints. The washable paints of the invention can be created in a variety of vivid colors and has advantageous performance characteristics. The paint has good aesthetics—the paint does not drip, and paints smoothly. In addition, the polyethylene glycol, the water swellable clay, and high molecular weight cellulosic thickener (preferably carboxymethyl cellulose) improve fabric and skin washability of the aqueous based paint. The washable paint has depth of shade on paper, color that does not bleed into the paper, opacity, stability, pourability, is easily removed from fabric and skin, and does not drip from a brush when painting or sag when painted heavily and the paper is hung up before it dries.

The high molecular weight polyethylene glycol (PEG) improves both fabric and skin wash results, when added to the paint in an amount of about 2.5 to 10 weight percent. The high molecular weight PEG has a molecular weight of between 2,000 and 20,000, more preferably between 3,000 and 10,000. Lower molecular weight PEG's have a positive effect on removal from fabric and skin but the effect is not as great as high molecular weight. High percentages (above approximately 12%) of PEG adversely affect the paint stability with noticeable separation of the paint components occurring in just a few days. At lower percentages (about 2.5 to 10% wt), the paint is stable at 40° C. for 6 weeks and additionally has the benefit of improved removal from fabric and skin.

When the inventive paint is applied to paper, the colorants stay on the painted surface. The cellulosic thickener deters the colorants from diffusing into the paper with the water. Preferred cellulosic thickeners include, but are not limited to carboxymethyl cellulose (CMC), methylcellulose, and other cellulosic compounds. CMC has been found to keep colorants on the surface of the paper and paints with CMC have stability at higher temperature. The high molecular weight CMC will diffuse much slower into the paper than water. The CMC and other preferred cellulosic thickeners have a molecular weight of between 100,000 to 1,500,000. The viscosity of a 2% by weight solution of the cellulosic thickener is between 500 and 15,000 cps tested as a 2% by weight solution in water at 25° C., using a Brookfield DV-II+ viscometer with a number 21 spindle, a small sample adaptor for Brookfield and a speed of 2 rpm. Preferably, the high molecular weight cellulosic thickener is found in an amount between 0.25 to 2.5 percent by weight, more preferably 0.5 to 1.5 percent by weight of the formulation. With many other thickeners, the polymeric colorants can migrate into the paper with the water giving lighter appearing color on paper.

High molecular weight cellulose ethers keep the polymeric colorants on the surface almost as well as the inventive paint, however, a dramatic drop in viscosity is observed at elevated temperatures (125° F.) with a cellulose ether/hectorite clay thickened paint which may cause separation of the paint. The viscosity of the mixture may be found in FIG. 6. For comparison, the plate-on-plate viscosity of the inventive paint at 125° F. is given in FIG. 7. The viscosity of the inventive paint, comprising CMC and hectorite clay does not drop significantly at 125° F. The washable paint of the invention has a viscosity of between 5,000 and 50,000 cps tested on a Brookfield viscometer with a number 6 spindle at 10 rpm and 52° C. (125° F.).

Formulators utilize smectite and other water swellable clays in coatings to develop specific rheological and performance properties in formulations. Preferred water swellable clays contain plates or platelets and are capable of hydrogen bonding. These properties are a result of their unique particle morphology, swelling capability and stable gel structure. This structure provides a shear thinning profile leading to many key characteristics. These characteristics include thixotropic flow, excellent spray properties, superior suspension and resistance to sag that can differentiate coatings in the market. Outside of the basic properties expected of the clay additives, formulations using hectorite-based rheological additives demonstrate superior resistance to settling and syneresis, improved pumpability and circulation stability, and excellent application and metal-control properties.

The swellable clay is preferably a smectite clay. Smectite is a family of layered silicate clays that have the ability to swell in water. Within this family are the inorganic clays of the montmorillonite type (eg bentonite or aluminium silicate) and hectorite (magnesium silicate). The effect as thickener is based on a spatial alignment of the clay platelets or gel formation by hydrogen bonding. Preferably, the water swellable clay is found in amount of between 0.25 and 1.5% by weight, more preferably 0.5 to 1.0% by weight in the paint formulation.

More details on the hectorite species may be found in U.S. Pat. No. 4,504,395. One hectorite clay which may be used in accordance with the invention is sold under the trademark "Capritone H" by Capricorn Chemicals. Preferred clays, hectorite and bentonite are swelling clays useful as a flow control agent in a wide variety of applications. Synthetic hectorite was synthesized in the early 1960's and is commercially marketed under the tradename Laponite by Laporte Industries, Ltd., through its subsidiary, Southern Clay Products, Inc.

The preferred size range for the water swellable clay particles is between 1 and 15 micrometers. In some clay samples with larger particle sizes, it is necessary to shear the hectorite clay to exfoliate the platelets from the clay particles to reduce the particle size of the clay particles. Very large particles can be perceived. Removing the large particles improves the aesthetics of the paint. FIG. 1 shows the particle size distribution for the paint base which had not been sufficiently sheared. The plot shows there are particles several hundred microns in size and this sample settled out.

FIG. 2 shows the particle size distribution for a paint base made in commercial size equipment that had been sheared for 40 minutes at a tip speed of 4,000 to 5,000 rpm. The maximum particle size is a little over 10 microns and the average particle size is approximately 2 micrometers. This sample was stable at 40° C. for 6 weeks. Shearing releases the platelets increasing the efficiency of the hectorite clay. There are more platelets available to hydrogen bond to one another. The paint stability is improved by eliminating the very large particles that are more prone to settle.

The water swellable clay and cellulosic thickener compliment each other. The mixture of rheology additives at the ratios specified give properties that are superior to those using either the clay or the cellulosic thickener single rheology additive individually. Preferably the ratio by weight of the clay to the cellulosic thickener is between 30:70 and 80:20. This range has been found to have the preferred properties of the invention.

FIG. 3 shows the plate-on-plate viscosity for the inventive paint. For the first 10 seconds the shear was very low (1.0/sec). At low shear, the paint has a viscosity of about 11,000 cps. This high viscosity keeps the insoluble opacifier from settling. Over the next 15 seconds, the shear was increased from 1.0/sec to 250/sec, which approximates painting with a brush. The paint is thixotropic meaning that the viscosity decreases when the shear of painting is applied allowing the paint to flow and be easily spread. For the last 30 sec, the shear was very low (1.0/sec). When the shear is reduced, the plot shows that the viscosity immediately increases and over time increases to approximately the value initially measured. The quick increase in viscosity means the paint will have little tendency to drip or sag. The quick increase in viscosity also reduces the likelihood that the opacifier will settle.

FIG. 4 shows the plate-on-plate viscosity for the paint thickened only with hectorite clay. The experiment was run as described above. The plot has a form similar to that of the inventive paint, however, when the paint is applied to paper, an unacceptable amount of the color in the paint flows with the water into the paper giving an undesired pastel shade. The stability of paint thickened only with hectorite clay is poor especially at elevated temperatures.

FIG. 5 shows the plate-on-plate viscosity for the paint thickened only with CMC. The experiment was run the same as the experiment for the invention materials. The initial viscosity is similar to the initial viscosity of the inventive paint, however, when low shear is applied, the viscosity increases to over 60,000 cps. This characteristic is objectionable in paint. The paint resists being spread and does not easily transfer from the brush to the paper.

One possible way to overcome the increase in viscosity under low shear described above is to use a lower molecular weight CMC. A low molecular weight CMC will show less increase in viscosity with low shear. However, it has been observed that the stability of the paint is reduced especially at elevated temperatures when lower molecular weight CMC's are used.

The washable paint preferably includes calcium carbonate or other opacity increasing agent such as titanium dioxide. This opacity increasing agent may be added to children's paints to make bright, opaque colors or may be reduced or be absent from the formulation to create a more transparent paint like finger paint. In one embodiment of the invention, the calcium carbonate is in the formulation in an amount between 2 and 15% by weight and has a particle size of between 0.1 and 30 micrometers, more preferably 1 and 10 micrometers. When the particles are 35 micrometers and greater, it may become more difficult to stabilize the particles in the formula and some settling might occur. The calcium carbonate has a dry Y brightness value of between 90 and 98 and a dry b* value of between −0.25 and 0.5. Having the dry b* value of between −0.25 and 0.5 helps the paint base remain calorimetrically neutral before the colorant is added.

The paint includes a colorant that may include any known colorants. Preferably, the colorant is a polymeric colorant or an acid dye. If an acid dye is used in the paint formulation, there are multiple commercially available additives which improve dye removal from skin that may be selected and added to the formulation.

The film forming resin and defoamer were chosen to not adversely affect important paint properties. One preferred film forming resin is dextrin. Dextrins are widely known as products of the hydrolysis of starch, often by amylases. The viscosity of dextrins, in aqueous solution, varies depending on dextrin length and degree of branching. The term "dextrin" includes native dextrins of any origin, synthetic, natural or hybrid, derived, for example from maize, potatoes, manioc, corn, waxy corn, wheat, rice, and the like. Other film forming resins may be used include, but are not limited to other dextrins, malto-dextrin, starches, cellulosics, polyvinyl alcohol, and polyvinyl pyrrolidone.

Preferably, the washable paint formulation includes a defoamer. The defoamer must be selected to obtain the desired defoaming characteristics without negatively affecting other properties of the paint. Defoamers used in too high a concentration or choice of the wrong defoamer will adversely affect removal of the washable paint from fabric and skin.

The washable paint formulation preferably contains a biocide which is active in the paint base. Some biocides are not active in this paint base. The biocide used may include, but is not limited to isothiazolins available as Kathon CG/ICP and Kathon PFM from Rohm & Haas, blends of bicyclic oxazolidines available as Nuosept 95 from CreaNova, 2,6-dimethyl-m-dioxan-4-ol available as Bioban DXN from Angus Chemical, triazaazoadamantane available as Dowicil 75 from Dow, hydroxy benzoates available as Phenonip from Huls, benzisothiazolins available as Proxcel GXL from Zeneca, and glutaraldehyde available as Ucarcide 225 from Union Carbide.

An acrylic thickener or cellulosic thickener may be added to the paint formulation to adjust the formulation to the desired viscosity and rheology. The preferred acrylic thickener is an insoluble, alkali swellable acrylic thickener.

EXAMPLES

Example 1

Paint Base

To a 216 gallon stainless steel vessel with a 40 inch diameter, 821 pounds of water at approximately 26° C. were added. While stirring with a 14 inch diameter disperser blade (Cowels) at 800 to 900 rpm, 61 pounds of PEG 8000 molecular weight (Dow Chemical), 239 pounds of Hubercarb G2 calcium carbonate (JM Huber), 214 pounds of Cargill Plus 08509 dextrin (Cargill Food and Pharma Specialties), 0.6 pounds of Anti-foam FT-16 (Milliken Chemical), 17 pounds of Bentone EW (Elementis), and 24 pounds of Finnfix 2000G CMC (Noviant) were successively added. The mixture was stirred for two to three minutes while the viscosity increased. The stirrer speed was increased to 1,300 rpm (~4,700 f/min) and the mixture stirred for 40 minutes. The temperature of the mixture increased from room temperature to 130° F. To the warm mixture 442 pounds of ice water (T=35° F.) were added with stirring. After stirring for five minutes, the temperature had been lowered to 105° F. To the stirring mixture, 2.7 pounds of Kathon GC/ICP (Rohm and Haas) were added and the mixture stirred for five minutes to give the paint base. The maximum particle size was less than 11 microns as measured with a Microtrac X100.

Example 2

Blue Paint

To 441.0 pounds of the paint base from Example 1, 5.67 pounds of Creatint Blue (Milliken Chemical) and 1.57 pounds Creatint FL Pink (Milliken Chemical) were added with stirring. The mixture was stirred at 1,200 rpm for 15 minutes to give the inventive children's washable paint in a blue color. The paint was a creamy viscous liquid free of large agglomerates.

The viscosity was measured with a Brookfield RVDII viscometer using spindle S 06 at 25° C. to give 11,800 centipoise at 10 rpm and 3710 centipoise at 100 rpm.

The blue paint was applied to Leneta 3NT-4 regular bond neutral white paper using an Acculab Jr. (Gardco) with a #50 wire rod. The paint was applied to three pieces of paper and allowed to air dry. The CIE shade was measured with a Macbeth Color Eye in reflectance mode with D65 illuminant and 10° angle on each of the three samples and averaged to give the results shown in the table below.

Example 3

Yellow Paint

To 441.1 pounds of the paint base from Example 1, 9.14 pounds of Palmer Yellow R (Milliken Chemical) was added with stirring. The mixture was stirred at 1,200 rpm for 15 minutes to give the inventive children's washable paint in a yellow color. The paint was a creamy viscous liquid free of large agglomerates.

The viscosity was measured with a Brookfield RVDII viscometer using spindle S 06 at 25° C. to give 12,600 centipoise at 10 rpm and 3850 centipoise at 100 rpm.

The yellow paint was applied to Leneta 3NT-4 regular bond neutral white paper using an Acculab Jr. (Gardco) with a #50 wire rod. The paint was applied to three pieces of paper and allowed to air dry. The CIE shade was measured with a Macbeth Color Eye in reflectance mode with D65 illuminant and 10° angle on each of the three samples and averaged to give the results shown in the table below.

Example 4

Blue Finger Paint

To a four inch diameter stainless steel beaker, 724.9 g of water were added. While stirring with a 2 inch diameter disperser blade (INDCO 2-A from Paul N. Gardner) at 1,100 to 1,200 rpm, 54.0 g of PEG 8000 molecular weight (Dow Chemical), 27.0 g of Hubercarb G2 calcium carbonate (JM Huber), 54.0 g of Cargill Plus 08509 dextrin (Cargill Food and Pharma Specialties), 1.21 g of Anti-foam FT-16 (Milliken Chemical), 7.2 g of Bentone EW (Elementis), and 9.0 g of Finnfix 2000 g CMC (Noviant) were successively added. The mixture was stirred for two to three minutes while the viscosity increased. The stirrer speed was increased to 4,000 rpm (2,100 ft/min) and the mixture stirred for 65 minutes. To the mixture 20.2 g of TT-615 acrylic emulsion (Rohm and Haas) were added with stirring. After stirring for five minutes the pH was adjusted from 7.23 to 8.61 with 3.1 g of 10% sodium hydroxide. To the stirring mixture, 4.5 g of Nuosept 95 (Hulls America) were added and the mixture stirred for five minutes to give the finger paint base.

To 196.714 g of the finger paint base, 2.572 g of Creatint Blue (Milliken Chemical) and 0.714 g of Creatint FL Pink (Milliken Chemical) were added with stirring. The mixture was stirred at 1,200 rpm for 15 minutes to give the inventive children's washable finger paint in a blue color. The paint was a creamy viscous semi-liquid free of particulates.

The viscosity was measured with a Brookfield RVDII viscometer using spindle S 06 at 25° C. to give 29,300 centipoise at 10 rpm and 6,800 centipoise at 100 rpm.

The paint components as a weight percent of the paint formulation for the 3 examples shown in the table below.

| Paint Component | Example 2 | Example 3 | Example 4 |
|---|---|---|---|
| % PEG | 3.3 | 3.3 | 6.0 |
| % $CaCO_3$ | 12.9 | 12.9 | 3.0 |
| % Bentone | 0.92 | 0.92 | 0.8 |
| % CMC | 1.3 | 1.3 | 1.0 |
| % Bentone/% CMC | 42/58 | 42/58 | 44/56 |

Comparative Acid Dye Colored Paint

The comparative acid dye colored paint was a blue colored acid dye paint that was commercially available. The paint did not contain a commercially available additive known to increase the washability of dyes from skin and other porous surfaces.

Comparative Pigment Colored Paint

The comparative pigment-based colored paint was a blue colored pigment based paint that was commercially available.

The paints were applied to Leneta 3NT-4 regular bond neutral white paper using an Acculab Jr. (Gardco) with a #50 wire rod. The paint was applied to three pieces of paper and allowed to air dry. The CIE shade was measured with a Macbeth Color Eye in reflectance mode with D65 illuminant and 100 angle on each of the three samples and averaged to give the results shown in the table below.

The Leneta 3NT-4 paper has a black stripe. The relative opacity is calculated by measuring the CIE shade on the white and black portions of the paper and calculating $\Delta E$, the total color change. The lower the $\Delta E$, the more opaque is the paint. A completely opaque paint will have no color difference between the white and black portions of the paper. The higher the $\Delta E$, the more transparent is the paint. The colorimetry data below ($L^*$, $a^*$, $b^*$, and $\Delta E$) are the averages of three tests.

|  | Over White | | | Over Black | | | |
| --- | --- | --- | --- | --- | --- | --- | --- |
|  | $L^*$ | $a^*$ | $b^*$ | $L^*$ | $a^*$ | $b^*$ | $\Delta E$ |
| Blue Paint (Example 2) | 49.23 | −16.22 | −43.3 | 39.62 | −12.66 | −24.98 | 20.99 |
| Yellow Paint (Example 3) | 80.57 | 5.11 | 81.98 | 57.14 | −2.26 | 45.1 | 44.31 |
| Blue Finger Paint (Example 4) | 49.86 | −16.89 | −41.08 | 32.22 | −7.96 | −13.94 | 33.59 |
| Comparative Acid Dye Colored Paint | 45.59 | −12.97 | −37.91 | 36.53 | −10.09 | −19.79 | 20.46 |
| Comparative Pigment Colored Paint | 47.05 | −1.11 | −52.06 | 37.54 | −3.68 | −31.60 | 22.71 |

Testing

Fabric Wash Procedure for Children's Washable Paints

Adapted from—AATCC Test Method 130-1995. Soil Release: Oily Stain Release Method.

Using a plastic template with 1.0 inch by 2.0 inch rectangles cut out, 0.20 to 0.25 grams of the test paint is applied with a brush to 100% cotton Jersey knit white tee shirt. The paint is brushed to cover the entire rectangle. The paint identification is marked with a permanent black Sharpie pen below the painted sample. The paint is allowed to dry between 18–24 hours at room temperature (70 to 72° F.).

After drying, the stained cotton tee shirt and enough 36 inch by 36 inch white 100% cotton sheeting fabric (from Testfabrics, Inc, West Pittston, Pa.) are combined so that the total amount of fabric being washed is 4.0 lb. No more than 10 stains are applied to a single shirt and no more than 10 stains per wash load. The fabric is washed in a home laundry machine set on large load (our Kenmore model 110.23832100 uses 182.5 lb of water), 12 minute heavy wash cycle at 100±5° F. (37.7±2° C.) with 100 grams of Tide powder laundry detergent, and warm rinse.

After washing, the entire load is dried on medium heat for 40 minutes in a standard home dryer. After drying, the test tee shirt is pressed with a steam iron on the lowest steam setting, and graded using the following scale.

Grading scale for fabric stains after washing:
0=no visible stain
1=slight stain
2=moderate stain
3=severe stain
4=appears not to have been washed

|  | Fabric Wash Test Results |
| --- | --- |
| Blue Paint (Example 2) | 0 |
| Yellow Paint (Example 3) | 0 |
| Blue Finger Paint (Example 4) | 0 |
| Comparative Acid Dye Colored Paint | 1 |
| Comparative Pigment Colored Paint | 3 |

Skin Wash Procedure for Children's Washable Paints

The tester's hands are washed with Liquid Ivory Soap and warm (104±2° F.) running tap water. The tester's hands are rinsed with warm (104±2° F.) running tap water and thoroughly dried with paper towels.

To a 0.25 inch by 1.0 inch section on the palm of the hand, 0.05 ml of the paint to be tested is applied with a small brush. The paint is allowed to dry for 15 minutes at room temperature (70±2° F.; 21±1° C.).

After drying for 15 minutes, the hands are dampened under running tap water (104±2° F.; 40±1° C.). One (1) pump of Liquid Ivory Soap is applied to the hands which are washed for 30 seconds, then rinsed in running tap water (104±2° F.; 40±1° C.) until all of the soap is removed. The hands are dried with a paper towel, and graded using the following scale.

Grading scale for skin stains after washing:
0=no visible stain
1=slight stain
2=moderate stain
3=severe stain
4=appears not to have been washed

|  | Skin Wash Test Results |
| --- | --- |
| Blue Paint (Example 2) | 0 |
| Yellow Paint (Example 3) | 0 |
| Blue Finger Paint (Example 4) | 0 |
| Comparative Acid Dye Colored Paint | 2 |
| Comparative Pigment Colored Paint | 0 |

While the invention has been illustrated and described in relation to certain exemplary embodiments, it is to be understood that such embodiments are exemplary and illustrative only. Accordingly, there is no intention that the present invention should be limited to any of the illustrated and described embodiments. Rather, it is contemplated that any number of other modifications and variations may become apparent to the skilled practitioner upon review of the present specification and/or through practice of the invention described herein. Accordingly, it is intended to cover all such modifications and variations as may fall within the full spirit and scope of the present invention as defined by allowable claims and all equivalents thereto. Other possible applications included but not limited to glue, chalk, putty, clay, marking device, temporary tattoos, temporary fabric and skin marker, stamp pad, etc.

What is claimed is:

1. A washable paint comprising:
   about 2.5 to 10 weight percent of a high molecular weight polyethylene glycol having a molecular weight between 2,000 and 20,000;
   a water swellable clay in the amount of 0.25 to 1.5 weight percent;
   a high molecular weight cellulosic thickener in the amount of about 0.25 to 2.5 weight percent, the high molecular weight cellulosic thickener having a molecular weight of about 100,000 to about 1,500,000, wherein the high molecular weight cellulosic thickener has a viscosity between 500 and 15,000 cps tested as a 2% by weight solution in water at 25° C. using a Brookfield DV-II+ viscometer with a number 21 spindle and a speed of 2 rpm; and
   a colorant, wherein the paint has a viscosity of between 5,000 and 50,000 cps tested on a Brookfield DV-II+ viscometer with a number 6 spindle at 10 rpm and 52° C.

2. The washable paint of claim 1, wherein the ratio by weight of the water swellable clay to the cellulosic thickener is between 30:70 and 80:20.

3. The washable paint of claim 1, wherein the high molecular weight polyethylene glycol has a molecular weight of between 3,000 and 10,000.

4. The washable paint of claim 1, wherein the water swellable clay has a particle size of between 1 and 15 micrometers.

5. The washable paint of claim 1, wherein the high molecular weight cellulosic thickener is carboxymethyl cellulose.

6. The washable paint of claim 1, further comprising a film forming resin.

7. The washable paint of claim 5, wherein the film forming resin is dextrin resin.

8. The washable paint of claim 1, further comprising a defoamer.

9. The washable paint of claim 1, further comprising a biocide.

10. The washable paint of claim 1, further comprising calcium carbonate particles.

11. The washable paint of claim 10, wherein the calcium carbonate particles are in an amount of between 2 and 15% by weight.

12. The washable paint of claim 10, wherein the calcium carbonate particles have a particle size of between 0.1 and 30 micrometers.

13. The washable paint of claim 10, wherein the calcium carbonate particles have a particle size of between 1 and 10 micrometers.

14. The washable paint of claim 10, wherein the calcium carbonate has a dry Y brightness value of between 90 and 98 and a dry b* value of between −0.25 and 0.5.

15. The washable paint of claim 1, wherein the colorant is a polymeric colorant.

16. The washable paint of claim 1, wherein the colorant comprises an acid dye.

17. The washable paint of claim 1, further comprising an acrylic thickener.

18. The washable paint of claim 1, wherein the water swellable clay is a smectite clay.

19. The washable paint of claim 1, wherein the water swellable clay is a hectorite clay.

20. The washable paint of claim 1, wherein the water swellable clay is a bentonite clay.

21. The washable paint of claim 1, wherein the water swellable clay is in the amount of 0.5 to 1.0 weight percent.

22. The washable paint of claim 1, wherein the cellulosic thickener is in the amount of 0.5 to 1.5 weight percent.

* * * * *